(12) United States Patent
Knight

(10) Patent No.: US 9,091,762 B2
(45) Date of Patent: Jul. 28, 2015

(54) METHODS AND SYSTEMS FOR AVOIDING A COLLISION BETWEEN AN AIRCRAFT ON A GROUND SURFACE AND AN OBSTACLE

(75) Inventor: Michael Knight, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 490 days.

(21) Appl. No.: 13/283,398

(22) Filed: Oct. 27, 2011

(65) Prior Publication Data

US 2013/0110323 A1     May 2, 2013

(51) Int. Cl.
| | |
|---|---|
| *G06F 17/00* | (2006.01) |
| *G01S 15/93* | (2006.01) |
| *G08G 5/00* | (2006.01) |
| *G08G 5/06* | (2006.01) |
| *G01S 13/93* | (2006.01) |
| *G01S 17/08* | (2006.01) |
| *G01S 17/93* | (2006.01) |
| *G01S 13/08* | (2006.01) |
| *G01S 15/08* | (2006.01) |
| *G05D 1/00* | (2006.01) |
| *G05D 1/02* | (2006.01) |

(52) U.S. Cl.
CPC ............. *G01S 15/93* (2013.01); *G01S 13/08* (2013.01); *G01S 13/93* (2013.01); *G01S 15/08* (2013.01); *G01S 17/08* (2013.01); *G01S 17/93* (2013.01); *G05D 1/0083* (2013.01); *G05D 1/0202* (2013.01); *G08G 5/0021* (2013.01); *G08G 5/065* (2013.01); *G05D 1/0231* (2013.01); *G05D 1/0255* (2013.01); *G05D 1/0259* (2013.01)

(58) Field of Classification Search
None
See application file for complete search history.

(56) References Cited

U.S. PATENT DOCUMENTS

| | | | |
|---|---|---|---|
| 3,917,199 A | 11/1975 | Dewitt | |
| 5,907,293 A * | 5/1999 | Tognazzini | ................... 340/903 |
| 6,118,401 A * | 9/2000 | Tognazzini | .................... 342/29 |

(Continued)

FOREIGN PATENT DOCUMENTS

| | | |
|---|---|---|
| EP | 2535498 A2 | 12/2012 |
| WO | 9918469 | 4/1999 |

(Continued)

OTHER PUBLICATIONS

Search Report/Written Opinion mailed Jan. 22, 2013 in PCT Application No. PCT/US/12/62120.

(Continued)

*Primary Examiner* — Jonathan L Sample
(74) *Attorney, Agent, or Firm* — Ingrassia, Fisher & Lorenz, P.C.

(57) ABSTRACT

The disclosed embodiments relate to methods and systems for avoiding a collision between an obstacle and a vehicle, such as an aircraft, on a ground surface. A processor receives a detection signal from one of a plurality of proximity sensors. The detection signal indicates that the obstacle has been detected. In response to receiving the detection signal, a video image signal is transmitted from the processor to a display in the cockpit of the aircraft. The video image signal corresponds to a particular video imager that is associated with the particular proximity sensor that detected the obstacle. A video image, of a particular region around the aircraft that includes the obstacle is displayed on a display. In response to receiving the detection signal, the processor can also transmit an alert signal, and a brake activation signal to activate a braking system to prevent the aircraft from colliding with the obstacle.

20 Claims, 3 Drawing Sheets

(56) References Cited

U.S. PATENT DOCUMENTS

| | | | |
|---|---|---|---|
| 6,876,906 B1* | 4/2005 | Zellers et al. ............... 701/3 |
| 7,076,366 B2 | 7/2006 | Simon et al. |
| 7,289,019 B1* | 10/2007 | Kertes ...................... 340/435 |
| 7,932,838 B2* | 4/2011 | Hamza et al. ............ 340/958 |
| 8,121,786 B2 | 2/2012 | Morbey et al. |
| 8,264,377 B2* | 9/2012 | Griffith ..................... 340/961 |
| 2002/0018009 A1* | 2/2002 | Rast ......................... 340/961 |
| 2003/0025614 A1 | 2/2003 | Kahn |
| 2003/0135327 A1* | 7/2003 | Levine et al. ............ 701/220 |
| 2003/0141965 A1* | 7/2003 | Gunderson et al. ...... 340/431 |
| 2005/0222769 A1 | 10/2005 | Simon |
| 2006/0007021 A1 | 1/2006 | Konya et al. |
| 2006/0074559 A1* | 4/2006 | Meunier ................... 701/301 |
| 2006/0238376 A1 | 10/2006 | Khatwa |
| 2007/0080968 A1* | 4/2007 | Kogure et al. ........... 345/474 |
| 2008/0062011 A1 | 3/2008 | Butler et al. |
| 2008/0306691 A1* | 12/2008 | Louis et al. .............. 701/301 |
| 2009/0018713 A1* | 1/2009 | Coulmeau et al. ........... 701/3 |
| 2009/0072996 A1* | 3/2009 | Schoepp ................... 340/903 |
| 2009/0164122 A1 | 6/2009 | Morbey et al. |
| 2010/0030426 A1 | 2/2010 | Okita |
| 2010/0079267 A1* | 4/2010 | Lin .......................... 340/435 |
| 2010/0123599 A1 | 5/2010 | Hamza et al. |
| 2012/0218412 A1* | 8/2012 | Dellantoni et al. ....... 348/148 |
| 2013/0110323 A1 | 5/2013 | Knight |
| 2013/0321169 A1 | 12/2013 | Bateman et al. |
| 2013/0321192 A1 | 12/2013 | Starr et al. |

FOREIGN PATENT DOCUMENTS

| | | | |
|---|---|---|---|
| WO | 2009/075648 A1 | 6/2009 | |
| WO | WO 2009075648 A1 * | 6/2009 | ............ G08G 5/00 |

OTHER PUBLICATIONS

PCT International Search Report and Written Opinion mailed Apr. 9, 2015 in PCT/US15/11943.

\* cited by examiner

METHODS AND SYSTEMS FOR AVOIDING A COLLISION BETWEEN AN AIRCRAFT ON A GROUND SURFACE AND AN OBSTACLE

TECHNICAL FIELD

Embodiments of the present invention generally relate to aircraft, and more particularly relate to methods and systems for avoiding collisions between an aircraft on a ground surface and an obstacle.

BACKGROUND OF THE INVENTION

An operator of an aircraft must often maneuver the aircraft while on the ground. This may happen during ground operations such as when the aircraft is taxiing, being maneuvered to or from a hangar, or backing an aircraft away from a terminal.

Obstacles on the ground, such as structures, other vehicles and other obstacles, may lie in the path of a vehicle. These obstacles can be detected by a person using their sense of sight. However, in many cases, due to the dimensions of the aircraft (e.g., large wing sweep angles, distance from cockpit to wingtip, etc.) and the operator's limited field of view of the areas surrounding the aircraft, it can be difficult for an operator to monitor extremes of the aircraft during ground operations. As a result, the operator may fail to detect obstacles that are located in "blind spots" in proximity to the aircraft. In many cases, the operator may only detect an obstacle when it is too late to take evasive action needed to prevent a collision with an obstacle.

Collisions with an obstacle can not only damage the aircraft, but can also put the aircraft out of service and result in flight cancellations. The costs associated with the repair and grounding of an aircraft are significant. As such, the timely detection and avoidance of obstacles that lie in the ground path of a vehicle is an important issue that needs to be addressed.

Accordingly, it is desirable to provide methods, systems and apparatus that can reduce the likelihood of and/or prevent collisions with the detected obstacles. It would also be desirable to assist the operator with maneuvering the aircraft and to provide an operator with aided guidance while maneuvering the aircraft so that collisions with such obstacles can be avoided. It would also be desirable to provide technologies that can be used to detect obstacles on the ground and identify aircraft position with respect to the detected obstacles (e.g., proximity of it's wings and tail or other portions that the operator can not directly observe). It would also be desirable to provide the operator with an opportunity to take appropriate evasive action to prevent a collision from occurring between the aircraft and the detected obstacles. Furthermore, other desirable features and characteristics of the present invention will become apparent from the subsequent detailed description and the appended claims, taken in conjunction with the accompanying drawings and the foregoing technical field and background.

SUMMARY

In one embodiment, a method is provided for avoiding a collision between an aircraft on a ground surface and an obstacle. A processor onboard an aircraft receives a detection signal from one of a plurality of proximity sensors. The detection signal indicates that the obstacle has been detected by a particular proximity sensor that transmitted the detection signal. In response to receiving the detection signal, a video image signal is transmitted from the processor to a display in the cockpit of the aircraft. The video image signal corresponds to a particular video imager that is associated with the particular proximity sensor that detected the obstacle. A video image, corresponding to the video image signal, of a particular region around the aircraft that includes the obstacle is displayed on a display. In response to receiving the detection signal, the processor can also transmit at least one of: an alert signal to an element in a cockpit of the aircraft, and a brake activation signal to activate a braking system to prevent the aircraft from colliding with the obstacle.

In another embodiment, a collision avoidance system for a vehicle is provided. The system includes a plurality of proximity sensors each being configured to detect a presence of obstacles in proximity to the vehicle, and to transmit a detection signal when an obstacle is detected, a plurality of video imagers each being configured to acquire video images of different regions around the vehicle that correspond to each of the video imagers, a first display in a cockpit of the vehicle, a braking system, and an onboard computer. The onboard computer is communicatively coupled to the plurality of proximity sensors, and the plurality of video imagers, and is operatively coupled to the braking system and the display. The onboard computer includes a processor. In response to receiving a detection signal from one of the plurality of proximity sensors, the processor transmits an alert signal to an element in the cockpit, a video image signal to the first display, and a brake activation signal to activate the braking system to prevent the vehicle from colliding with the obstacle. The video image signal corresponds to a particular video imager that is associated with the particular proximity sensor that detected the obstacle. The first display is designed to display a video image, corresponding to the video image signal, of a particular region around the vehicle that includes the obstacle.

In another embodiment, a collision avoidance system for an aircraft is provided. The collision avoidance system includes a first display in a cockpit of the aircraft, a plurality of proximity sensors mounted at a plurality of extremity portions of the aircraft, a plurality of video imagers mounted at the plurality of extremity portions of the aircraft, and an onboard computer that is communicatively coupled to the plurality of proximity sensors and the plurality of video imagers, and operatively coupled to the first display. Each of the proximity sensors is configured to detect presence of obstacles in proximity to the aircraft, and to generate and transmit a detection signal when an obstacle is detected. Each of the video imagers is configured to acquire video images of different regions around the aircraft that correspond to the video imager. The onboard computer includes a processor that transmits, in response to receiving a detection signal from one of the plurality of proximity sensors, an alert signal to an element in the cockpit, and a video image signal to the first display. The video image signal corresponds to a particular video imager that is associated with the particular proximity sensor that detected the obstacle. The first display is configured to display a video image, corresponding to the video image signal, of a particular region around the aircraft that includes the obstacle.

DESCRIPTION OF THE DRAWINGS

Embodiments of the present invention will hereinafter be described in conjunction with the following drawing figures, wherein like numerals denote like elements.

DESCRIPTION OF EXEMPLARY EMBODIMENTS

As used herein, the word "exemplary" means "serving as an example, instance, or illustration." The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary or the following detailed description.

Figure 1:
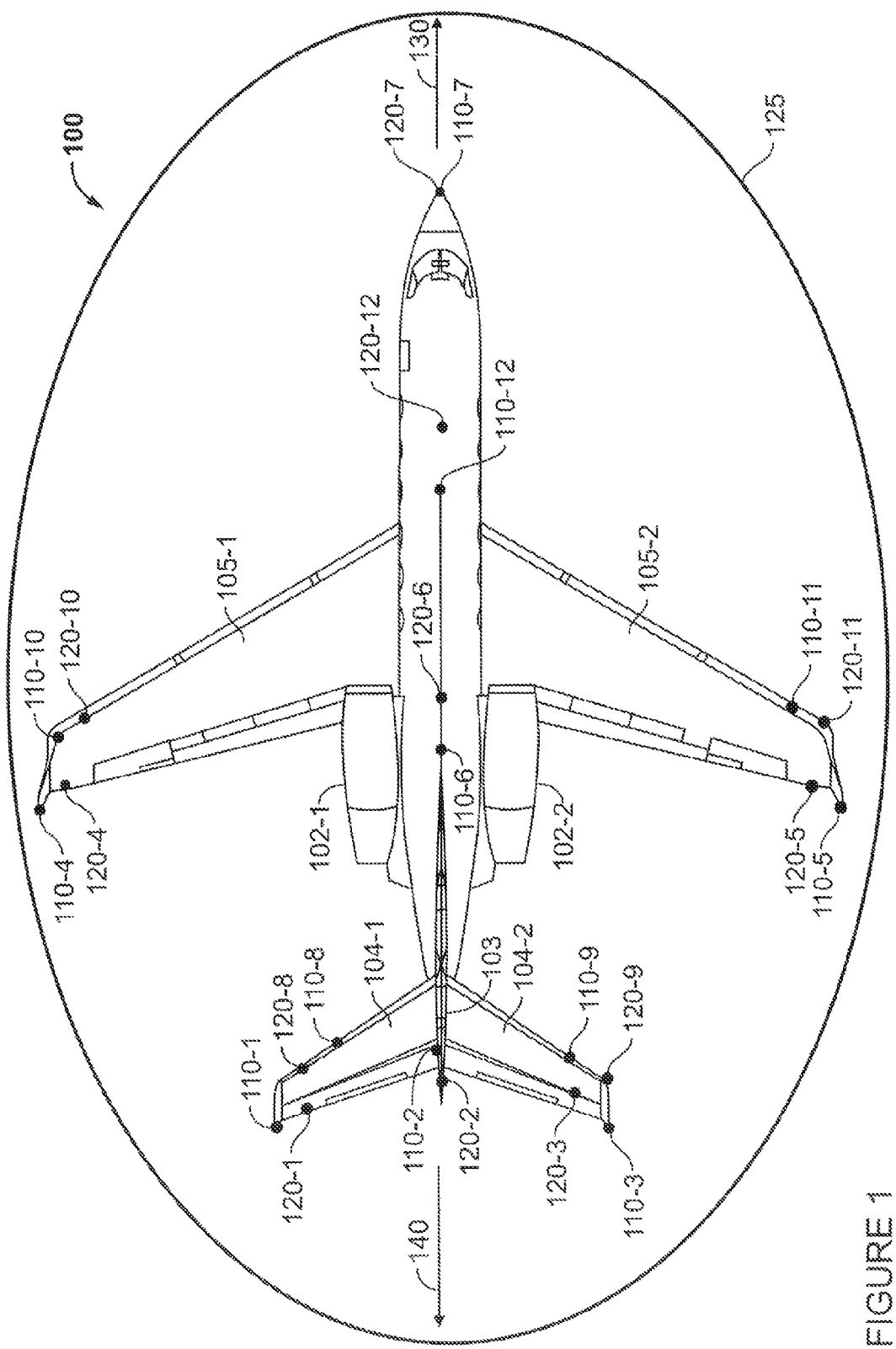
FIG. 1 is a top view of an aircraft that includes instrumentation for implementing a collision warning and avoidance system in accordance with some of the disclosed embodiments.

FIG. 1 is a top view of an aircraft 100 that includes instrumentation for implementing a collision warning and avoidance system in accordance with some of the disclosed embodiments. As will be described below, the collision warning and avoidance system can be used to reduce or eliminate the likelihood of collision of an aircraft 100 with ground obstacles that are in proximity of the aircraft when the aircraft is moving or taxing on a ground surface.

In accordance with one non-limiting implementation of the disclosed embodiments, the aircraft 100 includes a vertical stabilizer 103, two horizontal stabilizers 104-1 and 104-2, two main wings 105-1 and 105-2, two jet engines 102-1, 102-2, and a collision avoidance system that includes proximity sensors 110-1 . . . 110-12 that are disposed at points of extremity of the aircraft 100 (e.g., those portions of the aircraft 100 most likely to collide with an obstacle) of the aircraft 100, and corresponding video imagers 120-1 . . . 120-12. Although the jet engines 102-1, 102-2 are illustrated as being mounted to the fuselage, this arrangement is non-limiting and in other implementations the jet engines 102-1, 102-2 can be mounted on the wings 105-1, 105-2. The number and respective locations of proximity sensors and video imagers are non-limiting. In other implementations, either fewer or more proximity sensors 110 can be implemented, at either the same or different locations on the aircraft 100. Likewise, either fewer or more video imagers 120 can be implemented either at the same or different locations.

The proximity sensors 110-1 . . . 110-12 are disposed at extremity locations on the aircraft 100 that can not easily be monitored by the operator. It is noted that the terms "extremity locations," "points of extremity," and "extremity portions" are used interchangeably herein. In one embodiment, the proximity sensors 110-1 . . . 110-12 are oriented so respective coverage areas of the proximity sensors 110 are arranged to provide a full 360-degree detection coverage (e.g., within ellipse 125) for the aircraft 100 so that any obstacles in the space surrounding the aircraft 100 or in the vicinity of the aircraft 100 can be detected. The video imagers 120-1 . . . 120-12 are disposed at the locations on the aircraft 100 that can not be visually monitored by the operator and oriented so that their respective fields of view of the video imagers 120 are arranged to provide a full 360-degree effective field of view 125 of the aircraft 100 so that video images of any obstacles in the vicinity of the aircraft 100 can be acquired and monitored by aircraft personnel. In FIG. 1, the forward direction is designated via reference number 130, whereas the rearward direction is designated via reference number 140.

In the exemplary embodiment illustrated in FIG. 1, proximity sensors 110-1 and 110-3 may be disposed along (e.g., embedded at) opposite rearward-facing sides of the aircraft horizontal stabilizer (or tail) 104-1, 104-2, proximity sensor 110-2 may be disposed along the aircraft vertical stabilizer 103 (or along the opposite sides of an upper aircraft horizontal stabilizer in some implementations that have a T-tail stabilizer configuration), proximity sensors 110-4, 110-5 may be disposed along opposite rearward-facing sides of the wing tips, proximity sensor 110-6 may be disposed on the underside of the aircraft fuselage along the bottom-most portion of the aircraft fuselage, and the proximity sensor 110-7 may be disposed along the nose of the aircraft, proximity sensors 110-8, 110-9 may be disposed along the opposite forward-facing sides of the aircraft horizontal stabilizer, and proximity sensors 110-10, 110-11 may be disposed along opposite forward-facing sides of the wings, and proximity sensor 110-12 may be disposed along the top-most portion of the aircraft fuselage.

Each of the proximity sensors 110-1 . . . 110-12 are used to detect obstacles that may be present within their detection zone (e.g., within a particular region that is in the vicinity of the aircraft 100), and can generate a signal that will provide a warning signal to the aircraft 100 operator so that the operator has sufficient time to take appropriate evasive action to prevent a collision from occurring between the aircraft 100 and the detected obstacle.

Each of the proximity sensors 110-1 . . . 110-12 emit pulses (e.g., electromagnetic wave pulses, sound wave pulses, pulses of visible, ultraviolet or infrared light, etc.) which are directed and emitted as a broad beam towards a particular detection zone covering the field of view of the proximity sensor. The duration of the pulses define a detection zone of each proximity sensor. For a short period of time after each pulse is emitted by that proximity sensor, waves may be reflected back towards the sensor by an obstacle. The period of time is approximately equal to the time required for a pulse to travel from the sensor 110 to the detection zone and for a portion of the wave that is reflected towards the sensor 110 from an obstacle to reach the sensor 110. The period of time enables the distance between the sensor 110 and an obstacle within the detection zone to be calculated. For example, it is possible to measure the time required for a pulse to be reflected and use the time to calculate a distance between the sensor and a reflecting surface of the obstacle. For example, the distance between the sensor 110 and the detection zone can be calculated as the speed of the sensor medium (e.g., speed of light) divided by the time delay between transmitting the pulse and receiving a reflected wave from an obstacle within its detection zone. In some embodiments, such as when the proximity sensors are ultrasonic sensors, the calculation may also need to take into account the distance the aircraft travels during the time between transmitting the pulse and receiving the reflected wave from the obstacle. For instance, if an object were located 200 feet away from the aircraft and the taxi speed of the aircraft were 20 miles per hour, the aircraft would travel approximately 10 to 12 feet between transmission of the pulse signal and receiving the reflected wave.

The proximity sensors 110-1 . . . 110-12 that are employed may vary depending on the implementation. In one implementation, the proximity sensors 110-1 . . . 110-12 may be implemented using sonar or ultrasonic sensors (or transceivers) that generate and transmit sound waves. These proximity sensors receive and evaluate the echo that is reflected back to the proximity sensor. The time interval between sending the signal and receiving the echo can be used to determine the distance between the proximity sensor and a detected obstacle.

However, in other implementations, the proximity sensors 110-1 . . . 110-12 may be implemented using radar sensors, laser sensors, infrared sensors, light detection and ranging (LIDAR) sensors, infrared or laser rangefinders that use a set of infrared or laser sensors and triangulation techniques to detect an obstacle and to determine its distance from the aircraft, etc. For example, in one embodiment, the proximity sensors 110-1 . . . 110-12 can be infrared sensors that include an infrared light transmitter and receiver. Short light pulses are transmitted by the transmitter, and when at least some light pulses are reflected by an obstacle, the obstacle is detected by the receiver.

The range of distances that are within the field of view (FOV) of the proximity sensors 110-1 . . . 110-12 define obstacle detection zones for each sensor 110. The range of distances that are within the field of view of the proximity sensors 110-1 . . . 110-12 can vary depending on the implementation and design of the aircraft 100. Because the speed of taxi operations is typically slow, FOV and the range of the proximity sensors 110-1 . . . 110-12 should be limited to prevent nuisance activations of the system, but still give the operator enough time to take action when an obstacle is detected in the path of the aircraft 100. In one implementation, the field of view of the proximity sensors 110-1 . . . 110-12 can be between about 10 to 20 degrees, and the range can be up to about 200 feet. At a taxi speed of approximately 20 mph that would give the operator approximately 5 seconds to react to a warning from the proximity sensor.

In some embodiments, field of view and range of the proximity sensors 110-1 . . . 110-12 can be varied. For example, the size and location of the detection zone relative to the sensor 110 (and therefore the aircraft 100) can be varied in response to changes in the aircraft 100 speed or movements of the aircraft 100 to provide adequate warnings of a likely collision and to ensure that the operator will have sufficient time to take evasive action and prevent a collision from occurring should a warning signal be generated.

In some embodiments, the size of the detection zone or field of view of the sensor can be varied by changing the duration of a period or time (or duty cycle) during which the sensor 110 is activated. When the period of time between emitted pulses is varied, the range of the sensor 110 is varied. By reducing the period of time the detection zone is brought closer to the sensor 110, while increasing the time delay has the effect of moving the detection zone further away from the sensor 110. Thus, the detection zone may be moved away from the aircraft 100 in response to acceleration of the aircraft 100, and moved towards the aircraft 100 in response to deceleration of the aircraft 100.

In the exemplary embodiment illustrated in FIG. 1, video imagers 120-1 and 120-3 may be disposed along opposite rearward-facing sides lower aircraft horizontal stabilizers 104-1 and 104-2, video imager 120-2 may be disposed along the aircraft vertical stabilizer 103, video imagers 120-4, 120-5 may be disposed along opposite rearward-facing sides of the wing tips, video imager 120-6 may be disposed along the bottom-most portion of the aircraft fuselage to allow viewing of at least part of the region below the aircraft, the video imager 120-7 may be disposed along the nose of the aircraft, video imagers 120-8, 120-9 may be disposed along the opposite forward-facing sides of the aircraft horizontal stabilizer, video imagers 120-10, 120-11 may be disposed along opposite forward-facing sides of the wings, and video imager 120-12 may be disposed along the top-most portion of the aircraft fuselage to allow viewing of at least part of the region above the aircraft. It is noted that in other implementations, the aircraft may employ a T-tail stabilizer configuration that includes a vertical stabilizer and a upper horizontal stabilizer at the top of the vertical stabilizer. With such T-tail stabilizer configurations, additional video imagers (and proximity sensors) can be located along the opposite sides of the upper horizontal stabilizer.

The video imagers 120-1 . . . 120-12 are used to acquire video images of a particular region around the aircraft (including any obstacles that may be present in the vicinity of the aircraft 100), and to generate video signals (referred to herein as video image signals). Each of the video imagers 120-1 . . . 120-12 is capable of acquiring video images of a particular region (within its field of view) that is in the vicinity of the aircraft 100. In some operating scenarios, a particular region may include one or more obstacles within that particular region.

As will be described below, the video imagers can be used to view video images of regions around the aircraft. For example, the video imager 110-2 that is disposed along the aircraft vertical stabilizer, and the video imagers 110-4, 110-5 that are disposed along opposite sides of the wing tips can be used to view video images of regions around the aircraft that are often damaged when the aircraft 100 moves in a reverse direction 140.

Each of the video imagers 120-1 . . . 120-12 are operable to acquire (either prior to or during the commencement of motion of the aircraft 100) an image of a corresponding detection zone into which the aircraft 100 will move. The image can include detected obstacles, when present, and therefore, the video imagers 120-1 . . . 120-12 are operable to acquire an image of obstacles that might be located within a predetermined range of distances and within a field of view associated with the video imagers 120-1 . . . 120-12. It is noted that cases where no obstacle is detected, the video image signals generated by the video imagers 120-1 . . . 120-11 are not automatically displayed within the cockpit of the aircraft 100.

The video imagers 120-1 . . . 120-12 that are employed may vary depending on the implementation. In general, each video imager can be implemented using a video camera or other image capture apparatus. In some implementations, the video imagers 120-1 . . . 120-12 may be implemented using cameras such as high-definition video cameras, video cameras with low-light capability for night operations and/or cameras with infrared (IR) capability, etc.

The field of view of the video imagers 120-1 . . . 120-12 can vary depending on the implementation and design of the aircraft 100 so that the detection zone can be varied either by the operator or automatically depending on other information. In some embodiments, the field of view of the video imagers 120-1 . . . 120-12 can be fixed, while in others it can be adjustable. For example, in one implementation, the video imagers 120 can be cameras with a variable focal length (zoom lens) which can be varied to vary the FOV and/or direction of view. This feature can be used to vary the range and field of view based on the surrounding area and/or the speed and direction of travel of the aircraft so that the location and size of the space being imaged can be varied. When the video imagers 120-1 . . . 120-12 have an adjustable FOV (e.g., a variable FOV), a processor (not illustrated in FIG. 1) can command the camera lens to a preset FOV. In general, the field of view of the video imagers 120-1 . . . 120-12 is typically much wider than in comparison to that that of the proximity sensors 110. For example, in one implementation, the field of view of the video imagers 120-1 . . . 120-12 can be between about 150 to 160 degrees. The range of the video imagers 120-1 . . . 120-12 can also vary depending on the implementation and design of the aircraft 100.

In some implementations, the information acquired by the proximity sensors 110-1 . . . 110-12 can be processed to construct an image of any obstacles that lie within their field of view, in which case the video imagers 120-1 . . . 120-12 can be eliminated altogether.

Although not shown in FIG. 1, the aircraft 100 includes a computer that executes a collision warning and avoidance module (FIG. 2) that is capable of determining the location of obstacles relative to the proximity sensors 110-1 . . . 110-12. As the proximity sensors 110-1 . . . 110-12 are carried by the aircraft 100, the location of the obstacles relative to the proximity sensors 110-1 . . . 110-12 corresponds to the location of the obstacles relative to the aircraft. Operation of the collision warning and avoidance system, proximity sensors 110-1 . . . 110-12, and corresponding video imagers 120-1 . . . 120-12 will be described in greater detail below with reference to FIGS. 2 and 3.

Figure 2:
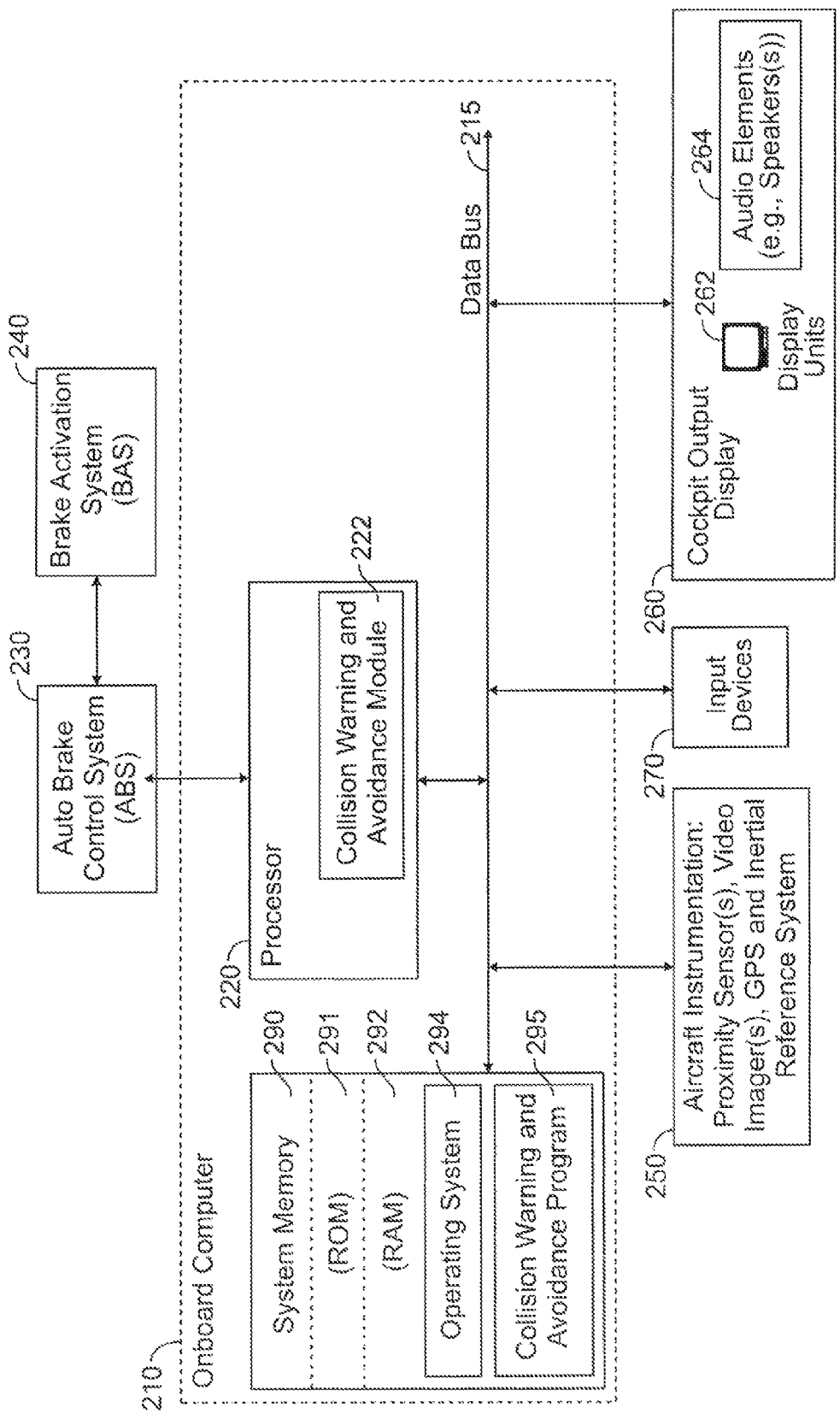
FIG. 2 is a block diagram of a collision warning and avoidance system that can be implemented in an aircraft in accordance with an exemplary implementation of the disclosed embodiments.

FIG. 2 is a block diagram of a collision warning and avoidance system 200 that can be implemented in an aircraft 100 in accordance with an exemplary implementation of the disclosed embodiments. The aircraft system 200 includes an onboard computer 210, an brake control system (BCS) 230, a brake activation system (BAS) 240, aircraft instrumentation 250, cockpit output devices 260 (e.g., display units 262 such as control display units, multifunction displays (MFDs), etc., audio elements 264, such as speakers, etc.), and various input devices 270 such as a keypad which includes a cursor controlled device, and one or more touchscreen input devices which can be implemented as part of the display units.

The onboard computer 210 includes a data bus 215, a processor 220, and system memory 290. The data bus 215 is used to carry signals communicated between the processor 220, the system memory 290, the BCS 230, BAS 240, aircraft instrumentation 250, cockpit output devices 260, and various input devices 270.

The various modules in the onboard computer 210 communicate with one another over a system data bus 215. For example, the processor 220 utilizes the system data bus 215 to communicate with: the brake control system (BCS) 230, the various aircraft instrumentation 250 via instrumentation interfaces (not shown), the various input devices 270 via input interfaces, and the system memory 290 via memory interface. Although not illustrated, it is also noted that in some implementations, the processor 220 can communicate with remote computers via a communication network interface over a wireless communication link.

The aircraft instrumentation 250 can include, for example, the proximity sensors, video imagers, elements of a Global Position System (GPS), which provides GPS information regarding the position and speed of the aircraft, and elements of an Inertial Reference System (IRS). In general, the IRS is a self-contained navigation system that includes inertial detectors, such as accelerometers, and rotation sensors (e.g., gyroscopes) to automatically and continuously calculate the aircraft's position, orientation, heading and velocity (direction and speed of movement) without the need for external references once it has been initialized.

The cockpit output devices 260 can include display units 262 and audio elements 264. The display units 262 can be implemented using any man-machine interface, including but not limited to a screen, a display or other user interface (UI). The audio elements can include speakers and circuitry for driving the speakers.

The input devices 270 can generally include, for example, any switch, selection button, keypad, keyboard, pointing devices (such as a cursor controlled device or mouse) and/or touch-based input devices including touch screen display(s) which include selection buttons that can be selected using a finger, pen, stylus, etc.

The system memory 290 can includes non-volatile memory (such as ROM 291, flash memory, etc.), volatile memory (such as RAM 292), or some combination of the two. The RAM 292 includes an operating system 294, and a collision warning and avoidance program 295. The processor 220 uses or executes the collision warning and avoidance program 295 (stored in system memory 290) to implement a collision warning and avoidance module 222 at processor 220. The collision warning and avoidance program 295 can include, among other things, a proximity sensor program module, a video imager and image display program module, and a braking system program module.

The proximity sensor program module can be programmed to control the field of view of the proximity sensors, and to control the type and frequency of alert signals generated in response to detection signals from the proximity sensors. As will be described below, the alert signals can be provided to an audio element 264 (e.g., speaker) in the cockpit, for example, whenever a potential obstacle is detected by the proximity sensors as approaching, or being approached by, the aircraft 100.

The video imager and image display program module is programmed to control characteristics (e.g., the field of view) of the video imagers and video image signals generated by the video imagers. The video imager and image display program module also controls the transmission of selected ones of the video image signals from the video imagers to the display units 262. In some implementations, the video imager and image display program module may be configured to process images (e.g., raw camera data) received from the video imagers so as to determine the range of an obstacle from the video imagers, movement of an obstacle, etc. This data can be used by the processor 220 to perform one or more tasks as described below.

When activated the brake control system (BCS) 230 can provide a control signal which controls a brake activation system (BAS) 240. The braking system program module of the collision warning and avoidance program 295 can be programmed to control the BCS 230 so that when an obstacle is detected in proximity of the aircraft, the BCS 230 can be used to control activation of the BAS 240 to either slow the aircraft to a selected speed to avoid a collision with the detected obstacle, and/or stop the aircraft at a selected position prior to colliding with the detected obstacle. In one embodiment, the BCS 230 is activated only when an obstacle is detected and the processor determines that a collision with a detected obstacle is imminent. The automatic function of the BCS 230 is immediately disarmed, for example, when the aircraft is moving above a ground speed threshold, when the throttle is advanced, when the operator manually brakes, when BCS 230 turned off, or when there is an indication of a brake fault or failure, etc.

In one embodiment, the braking system program can be executed by the processor to determine a deceleration rate required for slowing the aircraft to reach a specified velocity at a selected position (e.g., zero knots at some distance before reaching the detected obstacle). The deceleration rate can be determined, for example, based on a current position and a current ground velocity of the aircraft. For instance, in one implementation, upon detecting an obstacle and determining the aircraft's 100 distance from the detected obstacle, the processor 220 can use information regarding its current position and its current ground velocity, to calculate a deceleration rate required for slowing the aircraft to reach the specified velocity at the selected position (e.g., zero knots at some distance before reaching the detected obstacle). In one exemplary implementation, the current position of the aircraft can be determined based on a Global Positioning System (GPS) 250 position input from GPS instrumentation, and a current ground velocity of the aircraft can be determined based on an input from the inertial reference system (IRS) instrumentation 250. In another implementation, data from wheel speed sensors can be used to calculate ground velocity of the aircraft. By executing the braking system program 295, the processor 220 can continuously update the required deceleration rate based on the aircraft's current position and its current ground velocity until the aircraft reaches the specified velocity at the selected position (e.g., comes to a stop at some distance away from the detected obstacle).

Using the deceleration rate, the BCS 230 generates a control signal and sends it to the brake activation system 240. The control signal controls the brake activation system 240 to decelerate the aircraft at a rate until the aircraft reaches the specified velocity at the selected position (e.g., zero knots at some distance before reaching the detected obstacle).

Further operational details of the collision warning and avoidance system 200 will now be described with reference to FIG. 3.

Figure 3:
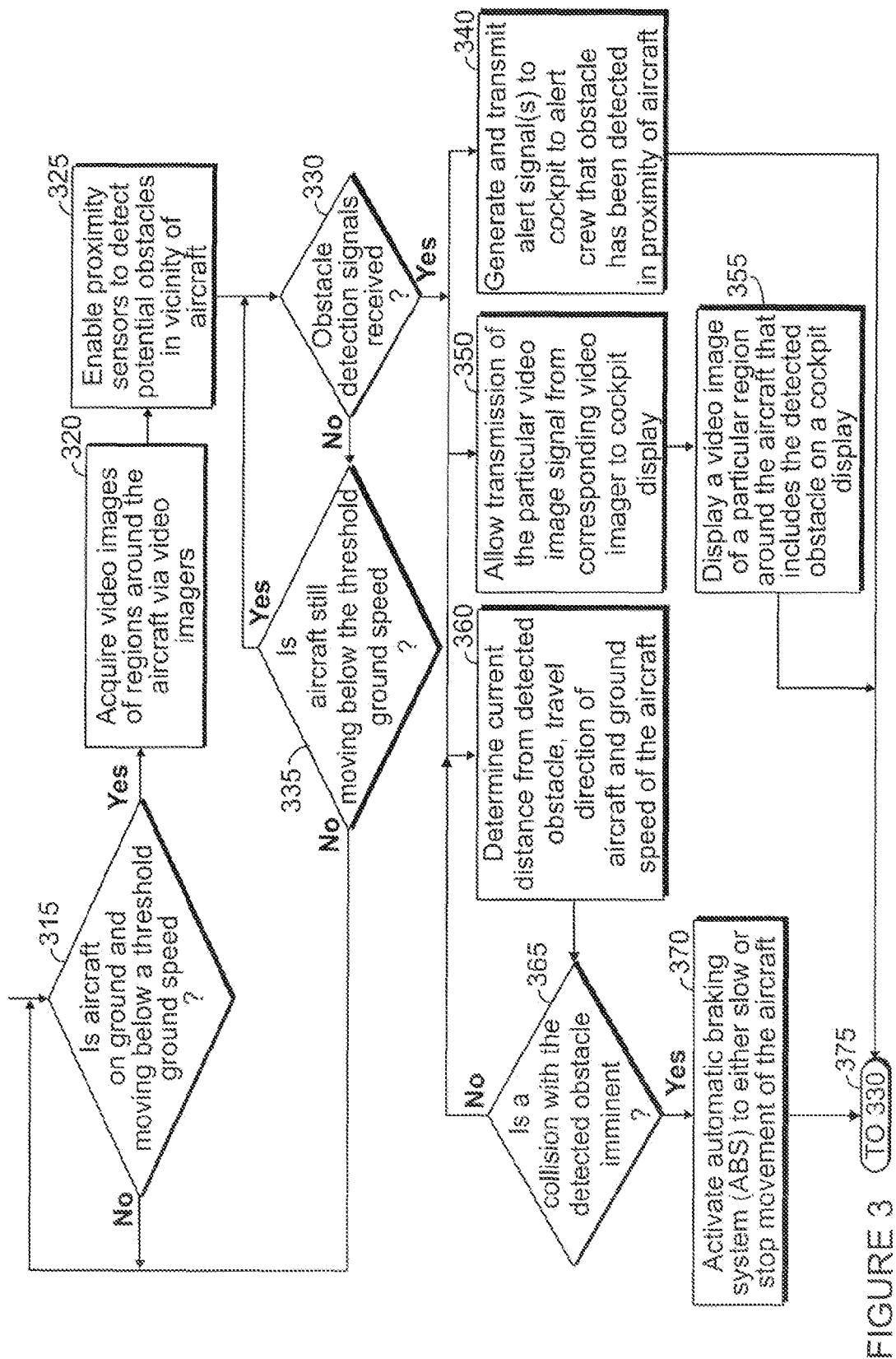
FIG. 3 is a flowchart of a method for collision warning and avoidance in accordance with some of the disclosed embodiments.

FIG. 3 is a flowchart of a method 300 for collision warning and avoidance in accordance with some of the disclosed embodiments. The method 300 of FIG. 3 will be described below with reference to FIGS. 1 and 2 to explain how the method 300 could be applied in the context of one exemplary, non-limiting environment.

At block/task/step 315, the processor 220 determines whether the aircraft 100 is on the ground and moving below a threshold ground speed. When the processor 220 determines that the aircraft 100 is either (1) not on the ground, or (2) is not moving or (3) is moving above a threshold ground speed, method 300 loops back to block/task/step 315. This way, when the aircraft is in the air (i.e., not on the ground), or alternatively is on the ground and not moving, the system is effectively disabled to prevent the cockpit display from being activated and displaying the video images in cases where it would not be useful. In addition, when the aircraft is on the ground and moving above a certain ground speed, the system is effectively disabled to prevent the cockpit display from being activated in the middle of a takeoff run, to prevent the braking system from being applied during takeoff and causing the brakes to be applied, etc.

By contrast, when the processor 220 determines that the aircraft 100 is both on the ground and moving below the threshold ground speed, the system 200 is enabled and the method 300 proceeds to block/task/step 320. At 320, the video imagers acquire video images of various regions around the aircraft 100 that correspond to each of the video imagers. In some operational scenarios, the video imagers will already be enabled and is use for other purposes (e.g., to display views outside the aircraft to the crew or passengers). In other operational scenarios, in which some or all of the video imagers are not enabled, the processor 220 can also transmits a signal to enable them at 320. At block/task/step 325, the processor 220 transmits a signal to enable proximity sensors to detect potential obstacles in the vicinity of the aircraft 100. This not only saves resources, but also prevents false system activations.

When a proximity sensor detects an obstacle, it transmits a detection signal to the processor 220 to indicate that an obstacle has been detected. In some implementations, the detection signal may optionally include information regarding the distance between the proximity sensor and the obstacle as well as the direction in which the obstacle has been detected.

At block/task/step 330, the processor 220 determines whether any detection signals have been received and hence whether any potential obstacles have been detected by any of the proximity sensors.

When the processor 220 determines that no detection signals have been received (and that no potential obstacles have been detected by the proximity sensors) at block/task/step 330, the method 300 may then proceed to block/task/step 335, where the processor 220 determines whether the aircraft 100 is still moving below the threshold ground speed. When the processor 220 determines (at 335) that the aircraft 100 is still moving at a ground speed that is less than the threshold ground speed, the method 300 loops back to block/task/step 330 to continue monitoring for obstacles. When the processor 220 determines that the aircraft 100 is no longer moving (i.e., is stationary) at block/task/step 335, the method 330 then loops back to block/task/step 315 to restart the method 300.

By contrast, when the processor 220 determines at block/task/step 330 that one or more detection signals have been received (thereby indicating that one or more potential obstacles have been detected and that a collision between the aircraft 100 and the detected obstacle is possible), the method 300 proceeds to one or more of block(s)/task(s)/step(s) 340, 350, 360. It is noted that all the blocks/tasks/steps 340, 350, 360 do not necessarily need to be performed during every implementation. In some implementations one or any combination of blocks/tasks/steps 340, 350, and 360 can be performed. Further, it is noted that the rate at which blocks/tasks/steps 340, 350, and 360 are performed can be either the same or different.

At block/task/step 340, the processor 220 generates and transmits an alert signal to the cockpit to provide an alert that an obstacle has been detected in the proximity of the aircraft 100. This is a first level of warning that there is a risk of a potential collision with the detected obstacle. This way the operator can react to the alert signal and take appropriate evasive action to avoid colliding with the detected obstacle.

The alert signal can vary depending on the implementation, and can generally be, for example, any known type of alarm or other warning signal that is designed to attract a person's attention either audibly (e.g., an alarm) or visually (e.g., a flashing light) or tactilely (e.g., shaking the steering wheel). For example, in one implementation, the alert signal can be an audio alert signal transmitted to an audio element in the cockpit to provide an audio alert (e.g., beep, siren, etc.) that an obstacle has been detected in the proximity of the aircraft 100. In one embodiment, the audio element (e.g., audio circuitry including amplifiers, speakers, etc.) can be driven by the audio alert signal to alert the operator and crew that an obstacle has been detected in proximity to the aircraft 100. For instance, the audio alert signal may cause an alarm to be sounded in the cockpit via a speaker that alerts the operator that an obstacle is near.

In another implementation, the alert signal can be a visual alert signal transmitted to a visual element in the cockpit. The visual alert signal provides a visual alert (e.g., flashing light, etc.) to the crew the obstacle has been detected in the proximity of the aircraft 100.

In another implementation, the alert signal can be a computer voice signal generated by a computer voice system. The computer voice signal can be used to generate a computerized voice that communicates the general region where the obstacle is present with respect to the aircraft 100 and/or its direction of movement. For example, when an obstacle is detected by proximity sensor 110-1, the processor 220 can generate a voice that says "obstacle approaching near the left rear." Similarly, when an obstacle is detected by proximity sensor 110-10, the processor 220 can generate a voice that says "obstacle approaching near front left wingtip." By contrast, when an obstacle is detected by proximity sensor 110-4, the processor 220 can generate a voice that says "obstacle approaching near the rear left wingtip."

Following block/task/step 340, the method 300 proceeds to block/task/step 375, where the method 300 loops back to block/task/step 330.

At block/task/step 350, the processor 220 transmits a video image signal, provided from the video imager that is associated with the proximity sensor that detected the obstacle, to a cockpit display. This allows a video image of the obstacle to be viewed by the operator and/or crew. It is noted that in some embodiments, although each of the video imagers generates a video image signal when enabled at 320, the video image signal is not automatically provided to the cockpit display unless a potential obstacle is detected at block/task/step 330.

At block/task/step 355, a video image of a particular region around the aircraft 100 that includes detected obstacle is displayed on a display. Optionally, in some embodiments, an indicator can also be displayed to identify where the particular region shown in the displayed video image is located is with respect to the aircraft 100. The indicator may have several different forms depending on the implementation.

When the aircraft includes multiple video imagers, the operator has no easy way of knowing which video image is being displayed at any particular time. It is important to provide a way for the operator know which video imager is providing the video image (of many potential video images) that is being shown on the cockpit display. As such, when the video image is displayed, at block/task/step 355, an indicator (or multiple indicators when applicable) can be displayed to identify the particular video imager that is providing the video that is being displayed, and where the particular region (that is being displayed in the video image) is located with respect to the aircraft, and/or the relative position of the detected obstacle with respect to the aircraft. These features help orient the operator as to which area of the aircraft corresponds to the video image being displayed. This provides the operator with a visual indication of where the obstacle is located with respect to the aircraft, and also provides the operator with a visual aid for determining what actions to take to avoid a collision.

In some implementations of block/task/step 355, an aircraft diagram (e.g., a symbolic representation of the aircraft) along with a symbolic representation of the detected obstacle relative to the aircraft is displayed to provide the operator with an indication of the position of the detected obstacle relative to the aircraft. In addition, in some embodiments, the location of the video imager, that is providing the video image signal that is being displayed on the cockpit display, and/or the location of the proximity sensor that provided the detection signal (and that triggered the detection of the obstacle) can also be displayed along with a distance between the detected obstacle and the video imager and/or proximity sensor. In addition, or alternatively, in some embodiments, a text indicator can be displayed, which identifies which video imager is providing the video image signal that is being displayed on the cockpit display, and/or which proximity sensor provided the signal that caused detection of the obstacle.

Following block/task/step 355, the method 300 proceeds to block/task/step 375, where the method 300 loops back to block/task/step 330.

At block/task/step 360, method 300 determines a current distance between the detected obstacle and the aircraft 100 (e.g., based on the detection signal from the proximity sensor), direction of movement or travel direction of the aircraft 100, and ground speed of the aircraft 100 from either wheel speed sensors, the IRS and/or GPS. The processor 220 uses this information to determine the speed at which the aircraft and obstacle are approaching each other and the likelihood of a collision occurring between the aircraft 100 and the detected obstacles.

Method 300 then proceeds to block/task/step 365, where the processor 220 determines whether a collision with the detected obstacle is imminent (e.g., likely to occur within a time threshold). Block/task/step 365 is optional and does not need to be formed in every implementation, in which case, method 300 proceeds to block/task/step 370 without performing block/task/step 365. However, when block/task/step 365 is performed, and a collision with the detected obstacle is determined not to be imminent, the method loops back to block/task/step 360. By contrast, when the processor 220 determines a collision of the detected obstacle is imminent, method 300 proceeds to block/task/step 370. At 370, the processor 220 transmits a signal to activate the braking system. This signal can either apply the braking system to slow speed of the aircraft 100 in a controlled manner to give the operator additional time to react to the detected obstacle, or can apply the braking system to slow and stop movement of the aircraft 100 completely so that collision with the detected obstacles is avoided. Block/task/step 370 prevents the aircraft 100 from colliding with the obstacle in situations where the operator and crew may not have adequate time to react to the audio alert signal or the video image that is displayed on the display. This way many collisions that might otherwise take place can be prevented. Following block/task/step 370, the method 300 proceeds to block/task/step 375, where the method 300 loops back to block/task/step 330.

The flowchart that is illustrated in FIG. 3 is exemplary, and is simplified for sake of clarity. In some implementations, additional blocks/tasks/steps can be implemented even though they are not illustrated in the FIG. 3 for sake of clarity. These additional blocks/tasks/steps may occur before or after or in parallel and/or concurrently with any of the blocks/tasks/steps that are illustrated in FIG. 3. It is also noted that some of the blocks/tasks/steps illustrated in FIG. 3 may be optional and do not need to be included in every implementation of the disclosed embodiments. In some implementations, although not illustrated, the presence or absence of certain conditions may need to be confirmed prior to execution of a block/task/step or prior to completion of a block/task/step. In other words, a block/task/step may include one or more conditions that are to be satisfied before proceeding from that block/task/step to the next block/task/step of FIG. 3. For example, in some cases, a timer, a counter or combination of both may execute and need to be satisfied before proceeding to the next block/task/step of the flowchart. As such, any block/task/step can be conditional on other blocks/tasks/steps that are not illustrated in FIG. 3.

It is also noted that there is no order or temporal relationship implied by the flowchart of FIG. 3 unless the order or temporal relationship is expressly stated or implied from the context of the language that describes the various blocks/tasks/steps of the flowchart. The order of the blocks/tasks/steps can be varied unless expressly stated or otherwise implied from other portions of text.

In addition, in some implementations, FIG. 3 may include additional feedback or feedforward loops that are not illustrated for sake of clarity. The absence of a feedback or a feedforward loop between two points of the flowchart does not necessarily mean a feedback or feedforward loop is not present between the two points. Likewise, some feedback or feedforward loops may be optional in certain implementations. Although FIG. 3 is illustrated as including a single iteration this does not necessarily imply that the flowchart does not execute for a certain number of iterations or continuously or until one or more conditions occur.

Those of skill in the art would further appreciate that the various illustrative logical blocks/tasks/steps, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for avoiding a collision between an aircraft on a ground surface and an obstacle, the aircraft comprising a fuselage, wings, a vertical stabilizer and a horizontal stabilizer, the method comprising:

receiving, at a processor onboard an aircraft, a detection signal from one of a plurality of proximity sensors comprising first proximity sensors disposed on the wings of the aircraft and a second proximity sensor disposed on at least one of the vertical stabilizer or the horizontal stabilizer, wherein the detection signal indicates that the obstacle has been detected by a particular proximity sensor that transmitted the detection signal;

receiving, at the processor onboard the aircraft, a plurality of video image signals each being generated by a particular one of a plurality of video imagers each being disposed at various different locations on the aircraft and each being associated with at least one of the proximity sensors, wherein the video imagers comprise first video imagers disposed on the wings of the aircraft and a second video imager disposed on at least one of the vertical stabilizer or the horizontal stabilizer;

transmitting only one particular video image signal of the plurality of video image signals from the processor to a display in the cockpit of the aircraft in response to receiving the detection signal, wherein the one particular video image signal corresponds to a particular one of the video imagers that is associated with the particular proximity sensor that detected the obstacle;

displaying a video image on the display corresponding to the one particular video image signal, wherein the video image is of a particular region around the aircraft that includes the obstacle; and transmitting, from the processor in response to receiving the detection signal, an alert signal to an element in a cockpit of the aircraft, and a brake activation signal to automatically activate a braking system to prevent the aircraft from colliding with the obstacle.

2. A method according to claim 1, further comprising:
continuously determining, at the processor when the aircraft is still moving below a threshold ground speed, whether a detection signal has been received from one of the proximity sensors.

3. A method according to claim 1, wherein the step of displaying a video image on the display corresponding to the video image signal, further comprises:
displaying an indicator to identify where the particular region that is being displayed in the video image is located is with respect to the aircraft.

4. A method according to claim 3, further comprising:
displaying, on a display in the cockpit, a representation of the aircraft along with a representation of the obstacle relative to the representation of the aircraft to provide an indication of the position of the obstacle relative to the aircraft.

5. A method according to claim 3, further comprising:
displaying, on a display in the cockpit, a representation of the aircraft, a representation of the particular video imager that is providing the video image that is being displayed with respect to the representation of the aircraft, a representation of the obstacle that provides a relative position of the obstacle with respect to the particular video imager, and an indication of a distance between the obstacle and the particular video imager that is providing the video image signal.

6. A method according to claim 1, wherein the braking system performs at least one of the following steps in response to the brake activation signal:
applying brakes to slow the ground speed of the aircraft in a controlled manner to prevent the aircraft from colliding with the obstacle; or
applying the brakes to completely stop movement of the aircraft prior to reaching the obstacle and prevent the aircraft from colliding with the obstacle.

7. A method according to claim 1, the method further comprising the steps of:
determining a speed at which the aircraft and the obstacle are approaching each other;
determining, based on the speed, an estimated time until a collision will occur between the aircraft and the obstacle;
determining whether the estimated time is less than an activation time threshold; and wherein the step of transmitting the brake activation signal, comprises:
transmitting a brake activation signal when the estimated time is less than the activation time threshold.

8. A method according to claim 7, wherein the step of determining a speed at which the aircraft and the obstacle are approaching each other, comprises the steps of:
determining a current distance between the obstacle and the aircraft based on the detection signal from the proximity sensor;
determining a direction of movement of the aircraft;
determining a ground speed of the aircraft; and
determining the speed at which the aircraft and the obstacle are approaching each other based on the current distance, the direction of movement and the ground speed.

9. A method according to claim 1, prior to the step of receiving, at a processor onboard an aircraft, a detection signal, further comprising the step of:
determining, at the processor, whether an aircraft is located on the ground surface and is moving below a threshold ground speed.

10. A method according to claim 9, when the processor determines that the aircraft is both on the ground surface and moving below the threshold ground speed, the method further comprising:
acquiring video images of various regions around the aircraft that correspond to each of the video imagers that are disposed along the aircraft; and
transmitting a second signal to enable a plurality of proximity sensors that are designed to detect obstacles in the vicinity of the aircraft.

11. A method according to claim 10, wherein the step of acquiring further comprises:
generating, at each of the video imagers, a video image signal.

12. A method according to claim 1, wherein the step of transmitting at least one alert signal, comprises:
transmitting at least one audio alert signal from the processor to an audio element in a cockpit of the aircraft, wherein the audio alert signal causes the audio element to generate an audible alert that comprises at least one of: an alarm, a beeping sound, a siren sound, and a computerized voice that announces the particular region where the obstacle is present.

13. A collision avoidance system for an aircraft comprising a fuselage, wings, a vertical stabilizer and a horizontal stabilizer, the system comprising:
a plurality of proximity sensors mounted at a plurality of extremity portions of the aircraft, the plurality of proximity sensors comprising first proximity sensors disposed on the wings of the aircraft and a second proximity sensor disposed on at least one of the vertical stabilizer or the horizontal stabilizer, the proximity sensors each being configured to detect presence of obstacles in proximity to the aircraft, and to transmit a detection signal when an obstacle is detected;
a plurality of video imagers mounted at the plurality of extremity portions of the aircraft, each of the video imagers each being configured to acquire video images of different regions around the aircraft that correspond to that particular one of the video imagers and generate a video image signal corresponding to video images acquired by that particular video imager, wherein the video imagers comprise first video imagers disposed on the wings of the aircraft and a second video imager disposed on at least one of the vertical stabilizer or the horizontal stabilizer;

a first display in a cockpit of the aircraft; and an onboard computer that is communicatively coupled to the plurality of proximity sensors and the plurality of video imagers, and operatively coupled to the first display, the onboard computer comprising:

a processor that is configured to:

receive a plurality of video image signals each being generated by a particular one of a plurality of video imagers each being disposed at various different locations on the aircraft and each being associated with at least one of the proximity sensors;

transmit, in response to receiving a detection signal from one of the plurality of proximity sensors, an alert signal to an element in the cockpit, and only one particular video image signal to the first display, wherein the one particular video image signal corresponds to a particular one of the video imagers that is associated with the particular proximity sensor that detected the obstacle, wherein the first display is configured to display a video image corresponding to the one particular video image signal, wherein the video image is of a particular region around the aircraft that includes the obstacle.

14. A system according to claim 13, further comprising:
a second display in the cockpit configured to display an indicator to identify where the particular region that is being displayed in the video image is located with respect to the aircraft.

15. A system according to claim 13, further comprising:
a second display in the cockpit configured to display a representation of the aircraft along with a representation of the obstacle relative to the representation of the aircraft to provide an indication of the position of the obstacle relative to the aircraft.

16. A system according to claim 15, wherein the second display is further configured to display a representation of the particular video imager, that is providing the video image that is being displayed, with respect to the representation of the aircraft, and a relative position of the obstacle with respect to the representation of the particular video imager that is providing the video image signal.

17. A system according to claim 13, wherein the processor is designed to confirm that the aircraft is on a ground surface and moving below a threshold ground speed prior to enabling the plurality of proximity sensors, wherein the plurality of proximity sensors are disabled when the processor determines that the aircraft is either (1) not on the ground surface, (2) is not moving or (3) is moving above a threshold ground speed.

18. A system according to claim 13, wherein the alert signal comprises an audio alert signal and the element comprises an audio element, wherein the audio alert signal causes the audio element to generate an audible alert that comprises at least one of: an alarm, a beeping sound, a siren sound, and a computerized voice that announces the particular region where the obstacle is present.

19. A system according to claim 13, further comprising:
a braking system, operatively coupled to the onboard computer, and comprising brakes of the aircraft, wherein the processor is further designed to transmit, in response to receiving the detection signal, a brake activation signal to activate the braking system to prevent the aircraft from colliding with the obstacle, wherein the brake activation signal causes the braking system to either: apply brakes of the aircraft to slow the ground speed of the aircraft in a controlled manner to prevent the aircraft from colliding with the obstacle, or apply the brakes to completely stop movement of the aircraft prior to reaching the obstacle and prevent the aircraft from colliding with the obstacle.

20. A collision avoidance system for an aircraft comprising a fuselage, wings, a vertical stabilizer and a horizontal stabilizer, comprising:

a plurality of proximity sensors each being configured to detect presence of obstacles in proximity to the vehicle, and to transmit a detection signal when an obstacle is detected, the plurality of proximity sensors comprising first proximity sensors disposed on the wings of the aircraft and a second proximity sensor disposed on at least one of the vertical stabilizer or the horizontal stabilizer;

a plurality of video imagers each being configured to acquire video images of different regions around the vehicle that correspond to each of the video imagers and to generate a video image signal corresponding to the video images acquired by that particular video imager,. wherein the video imagers comprise first video imagers disposed on the wings of the aircraft and a second video imager disposed on at least one of the vertical stabilizer or the horizontal stabilizer;

a first display in a cockpit of the vehicle;

a braking system; and an onboard computer, communicatively coupled to the plurality of proximity sensors and the plurality of video imagers, and operatively coupled to the braking system and the display, the onboard computer comprising:

a processor that is configured to:

receive a plurality of video image signals each being generated by a particular one of a plurality of video imagers each being disposed at various different locations on the aircraft and each being associated with at least one of the proximity sensors;

transmit, in response to receiving a detection signal from one of the plurality of proximity sensors:

an alert signal to an element in the cockpit;

only one particular video image signal to the first display, wherein the one particular video image signal corresponds to a particular one of the video imagers that is associated with the particular proximity sensor that detected the obstacle, wherein the first display is designed to display a video image corresponding to the one particular video image signal, wherein the video image is of a particular region around the vehicle that includes the obstacle; and a brake activation signal to activate the braking system to prevent the vehicle from colliding with the obstacle.

* * * * *